(12) United States Patent
Bell et al.

(10) Patent No.: US 8,840,956 B2
(45) Date of Patent: Sep. 23, 2014

(54) RETROREFLECTIVE COATING AND METHOD FOR APPLYING A RETROREFLECTIVE COATING ON A STRUCTURE

(75) Inventors: Thomas Reuben Bell, Cary, NC (US); Kevin Hall, Allen Park, MI (US); Thomas Still, Campbell, TX (US)

(73) Assignee: Potters Industries, LLC, Wilmington, DE (US)

( * ) Notice: Subject to any disclaimer, the term of this patent is extended or adjusted under 35 U.S.C. 154(b) by 876 days.

(21) Appl. No.: 12/262,641

(22) Filed: Oct. 31, 2008

(65) Prior Publication Data

US 2010/0112340 A1    May 6, 2010

(51) Int. Cl.
| | | |
|---|---|---|
| *B05D 5/06* | (2006.01) | |
| *C09D 5/33* | (2006.01) | |
| *E01F 15/04* | (2006.01) | |
| *E01F 9/04* | (2006.01) | |
| *E01F 15/08* | (2006.01) | |
| *C09D 7/12* | (2006.01) | |
| *C08K 3/40* | (2006.01) | |

(52) U.S. Cl.
CPC .............. *C09D 5/004* (2013.01); *B05D 5/063* (2013.01); *E01F 15/0407* (2013.01); *B05D 2601/20* (2013.01); *E01F 9/041* (2013.01); *E01F 15/083* (2013.01); *C09D 7/1216* (2013.01); *C08K 3/40* (2013.01)
USPC ............. 427/163.4; 427/137; 404/93; 404/94

(58) Field of Classification Search
USPC ............................ 427/163.4, 137; 404/93, 94
See application file for complete search history.

(56) References Cited

U.S. PATENT DOCUMENTS

| 2,326,634 A | 8/1943 | Gebhard |
| 2,407,680 A | 9/1946 | Palmquist |
| 2,440,584 A | 4/1948 | Heltzer |

(Continued)

FOREIGN PATENT DOCUMENTS

| EP | 0102818 A2 | 3/1984 |
| GB | 558002 | 12/1943 |

(Continued)

OTHER PUBLICATIONS

International Search Report for PCT/US2009/062729 (Form PCT/ISA/210) dated Jun. 1, 2010.

(Continued)

*Primary Examiner* — Elizabeth Burkhart
(74) *Attorney, Agent, or Firm* — Buchanan Ingersoll & Rooney PC

(57) ABSTRACT

A quantity of retroreflective granules includes glass members each having a refractive index of at least about 1.5. The quantity of retroreflective granules can be partially embedded into a binder material applied on the surface of a structure to provide a visual aid. A structure includes a retroreflective surface having an inclined face defined on at least a portion of the structure. The retroreflective surface also includes a binder material applied to at least a portion of the inclined face of the structure. The binder material has a thickness dimension of at least about 10 mil. The retroreflective surface further includes a plurality of retroreflective granules partially embedded in the binder material. The plurality of retroreflective granules have a density of at least about 0.06 pounds/square foot as embedded in the binder material. Each retroreflective granule includes a glass member having a refractive index of at least about 1.5.

15 Claims, 3 Drawing Sheets

(56) References Cited

U.S. PATENT DOCUMENTS

| | | | |
|---|---|---|---|
| 2,592,882 | A | 4/1952 | Fisher |
| 2,713,286 | A | 7/1955 | Taylor |
| 3,099,637 | A | 7/1963 | Nellessen |
| 3,413,058 | A | 11/1968 | Fang |
| 3,758,192 | A | 9/1973 | Bingham |
| 3,762,825 | A | 10/1973 | Reusser |
| 3,764,455 | A | 10/1973 | Lovell |
| 3,801,183 | A | 4/1974 | Sevelin |
| 3,877,787 | A | 4/1975 | Buzbee |
| 3,915,771 | A | 10/1975 | Gatzke |
| 3,971,692 | A | 7/1976 | Anderson |
| 4,031,048 | A | 6/1977 | Holmen |
| 4,040,760 | A | 8/1977 | Wyckoff |
| 4,055,377 | A | 10/1977 | Erickson |
| 4,069,787 | A | 1/1978 | Wyckoff |
| 4,105,808 | A | 8/1978 | McKenzie |
| 4,117,192 | A | 9/1978 | Jorgensen |
| 4,218,439 | A | 8/1980 | Rivier |
| 4,265,937 | A | 5/1981 | Kameya |
| 4,609,587 | A | 9/1986 | Giordano |
| 4,648,689 | A | 3/1987 | May |
| 4,681,401 | A | 7/1987 | Wyckoff |
| 4,721,649 | A | 1/1988 | Belisle et al. |
| 4,758,469 | A | 7/1988 | Lange |
| 4,772,155 | A | 9/1988 | Dinitz |
| 5,049,001 | A | 9/1991 | Dinitz |
| 5,128,203 | A * | 7/1992 | Laroche ............... 428/325 |
| 5,286,682 | A | 2/1994 | Jacobs et al. |
| 5,620,775 | A | 4/1997 | LaPerre |
| 5,650,213 | A | 7/1997 | Rizika |
| 5,679,437 | A | 10/1997 | Hackworth |
| 5,750,191 | A | 5/1998 | Hachey |
| 5,784,198 | A | 7/1998 | Nagaoka |
| 5,820,988 | A | 10/1998 | Nagaoka |
| 5,835,271 | A | 11/1998 | Stump |
| 5,873,187 | A | 2/1999 | Kozak |
| 5,882,771 | A | 3/1999 | Klein et al. |
| 5,917,652 | A | 6/1999 | Mathers |
| 5,941,655 | A | 8/1999 | Jacobs |
| 5,942,280 | A | 8/1999 | Mathers |
| 5,988,822 | A | 11/1999 | Abe |
| 6,247,818 | B1 | 6/2001 | Hedblom |
| 6,326,053 | B1 | 12/2001 | Stump |
| 6,479,132 | B2 | 11/2002 | Hedblom |
| 6,514,595 | B1 | 2/2003 | Sprouts |
| 6,521,718 | B2 | 2/2003 | Goeb et al. |
| 6,623,793 | B2 | 9/2003 | Mushett |
| 6,624,937 | B2 | 9/2003 | Kashima |
| 6,696,126 | B1 | 2/2004 | Fischer |
| 6,703,108 | B1 | 3/2004 | Bacon, Jr. |
| 6,734,227 | B2 | 5/2004 | Jing |
| 6,815,040 | B2 | 11/2004 | Pellerite |
| 6,884,510 | B2 | 4/2005 | Qiu |
| 6,905,754 | B2 | 6/2005 | Jing |
| 6,916,103 | B2 | 7/2005 | Currie et al. |
| 7,128,799 | B2 | 10/2006 | Majumdar |
| 7,303,292 | B2 | 12/2007 | Yukawa |
| 2002/0090505 | A1* | 7/2002 | Stoffers et al. ............ 428/325 |
| 2003/0012599 | A1 | 1/2003 | Wallgren |
| 2003/0090800 | A1 | 5/2003 | Humpal |
| 2003/0123930 | A1 | 7/2003 | Jacobs |
| 2005/0001342 | A1 | 1/2005 | Durant |
| 2005/0137266 | A1 | 6/2005 | Jing |
| 2006/0062965 | A1* | 3/2006 | Durant et al. ............ 428/143 |
| 2006/0165961 | A1 | 7/2006 | Tsutsui |
| 2006/0256439 | A1 | 11/2006 | Yukawa |
| 2006/0278737 | A1 | 12/2006 | Hall et al. |
| 2006/0293161 | A1 | 12/2006 | Frey |
| 2007/0110960 | A1 | 5/2007 | Frey |
| 2008/0030856 | A1 | 2/2008 | King |
| 2008/0253833 | A1 | 10/2008 | Gelfant et al. |
| 2009/0110813 | A1* | 4/2009 | Zimmerman et al. ....... 427/137 |

FOREIGN PATENT DOCUMENTS

| | | |
|---|---|---|
| GB | 559261 | 2/1944 |
| GB | 586594 | 3/1947 |
| GB | 598330 | 2/1948 |
| GB | 641547 | 8/1950 |
| GB | 867783 | 5/1961 |
| GB | 877083 | 9/1961 |
| GB | 903948 | 8/1962 |
| GB | 940424 | 10/1963 |
| GB | 952258 | 3/1964 |
| GB | 972442 | 10/1964 |
| GB | 985515 | 3/1965 |
| GB | 1000184 | 8/1965 |
| GB | 1037265 | 7/1966 |
| GB | 1087031 | 10/1967 |
| GB | 1201548 | 8/1970 |
| GB | 1209450 | 10/1970 |
| GB | 1447585 | 8/1976 |
| JP | 06-299521 | 10/1994 |
| JP | 10-015480 | 1/1998 |
| JP | 11-107227 | 4/1999 |
| JP | 2000-171624 | 6/2000 |
| JP | 2004-138671 | 5/2004 |
| JP | 2005-104768 | 4/2005 |
| JP | 2001-510097 | 12/2005 |
| JP | 2011-508979 | 3/2011 |
| RU | 2101779 C1 | 1/1998 |
| WO | 97/38835 A1 | 10/1997 |
| WO | 02/13978 A2 | 2/2002 |
| WO | WO/2004/110733 | 12/2004 |
| WO | 2008/007394 A1 | 1/2008 |
| WO | WO/2008/039912 | 4/2008 |

OTHER PUBLICATIONS

Written Opinion of the International Searching Authority for PCT/US2009/062729 (Form PCT/ISA/210) dated Jun. 1, 2010.

Potters Industries Inc., Standard Highway, Safety Marking Spheres, Sep. 2004.

Potters Industries Inc., Premium Highway; Safety Marking Spheres, Sep. 2004.

Potters Industries Inc., Visibead Plus II, Highway Safety Marking Spheres, Sep. 20, 2004.

Diamond Vogel Paint, TB-Series High Quality Alkyd Zone Marking Paint; TB-Series.doc revised Apr. 2007.

Diamond Vogel Paint, UC-Series Waterborne Traffic Marking Paint, UC-Series.doc revised May 2007.

Supplementary European Search Report for EP09824160 dated May 27, 2011.

Japanese Office Action dated Aug. 27, 2012 and English Translation.

Russian Office Action dated Dec. 27, 2013 and English Translation.

* cited by examiner

RETROREFLECTIVE COATING AND METHOD FOR APPLYING A RETROREFLECTIVE COATING ON A STRUCTURE

FIELD OF THE INVENTION

The present invention relates generally to reflective materials, and more specifically to a retroreflective coating and method for applying a retroreflective coating on surfaces.

BACKGROUND OF THE INVENTION

Various structures and improvements along roads and highways can create a risk of collision for motorists. Guard rails, Jersey walls, bridge abutments and other improvements that border traffic lanes create potential hazards if they are not well marked. In addition, improvements like curbs, bollards and utility poles can create unexpected hazards for motorists. The risk of colliding with roadside hazards can increase during evening hours, when darker conditions make it more difficult to see the hazards. Illumination of roadside hazards by overhead lighting is not always possible or economically feasible. Therefore, many roadside structures and improvements include some type of reflective material that reflects light from vehicle headlamps. The reflection of light helps drivers identify road hazards in time to safely avoid collisions with them.

To enhance the nighttime visibility of roadside hazards, retroreflective materials have been applied on the surface of the hazards. Retroreflective materials are desirable because they reflect light back to the light source with minimal scattering. In some cases, the retroreflective material includes a plurality of reflective elements held together with a liquid or fluid binder layer such as road paint. Problems arise when reflective elements and fluid binders are applied to surfaces that are not perfectly horizontal. Flat, curved or irregular surfaces having sections that are not horizontal (collectively referred to hereinafter as "inclined surfaces") can allow liquid binders to run off the surface before the binders cure. If the retroreflective coating contains reflective materials like glass beads, the beads may not adhere well to the inclined surface. Even if the beads do adhere to the surface, the beads and binder material may gradually settle under gravity and possibly drip off of the surface. Gravitational forces and other factors can prevent an adequate retroreflective layer from being formed on inclined surfaces.

SUMMARY OF THE INVENTION

The problems encountered in applying retroreflective coatings on inclined surfaces are resolved in many respects by the present invention. In a first aspect of the invention, a quantity of retroreflective granules includes glass members each having a refractive index of at least about 1.5. At least about 50 percent of the quantity of retroreflective granules have a maximum width greater than 0.012 in. The quantity of retroreflective granules can be partially embedded into a binder material that is applied to a surface of a structure.

In a second aspect of the invention, a structure includes a retroreflective surface having an inclined face defined on at least a portion of said structure. The retroreflective surface also includes a binder material applied to at least a portion of the inclined face of the structure, wherein a thickness dimension of the binder material is at least about 10 mil. The retroreflective surface further includes a plurality of retroreflective granules partially embedded in the binder material. The plurality of retroreflective granules is embedded in the binder material at a density of at least about 0.06 pounds/square foot. Each retroreflective granule includes a glass member having a refractive index of at least about 1.5.

In a third aspect of the invention, a method of applying a retroreflective surface to an inclined surface on a structure includes the step of applying a binder material to at least a portion of the inclined surface, wherein a thickness dimension of the applied binder material is at least about 10 mi. The method also includes the step of embedding a plurality of retroreflective granules at least partially within the thickness dimension of the binder material. The plurality of retroreflective granules have a density of at least about 0.06 pounds/square foot as embedded in the binder material. Each retroreflective granule includes a glass member having a refractive index of at least about 1.5 and a diameter greater than about 0.012 in.

In a fourth aspect of the invention, a retroreflective granule for partially embedding in a binder material includes a glass member having a refractive index of at least about 1.5 and a maximum width of at least about 0.012 in. The granule is configured for partially embedding in the binder material, which may be applied to an inclined surface.

BRIEF DESCRIPTION OF THE DRAWINGS

The foregoing summary and the following description will be better understood when reviewed in conjunction with the drawing figures, of which.

DETAILED DESCRIPTION OF PREFERRED EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The problems encountered in applying retroreflective coatings on inclined surfaces are resolved in many respects by the present invention, which utilizes a retroreflective material having a specific combination of physical parameters. The retroreflective material is applied over a binder material to form a retroreflective coating that overcomes many of the problems ordinarily encountered with inclined surfaces. The retroreflective coating can be applied over any inclined surface, such as the inclined face on a Jersey wall, the W-shaped contour of a conventional guard rail, or other inclined surface. In a preferred embodiment, the retroreflective material consists of a quantity of glass beads having a pre-selected refractive index and size distribution, among other properties. The glass beads are applied onto a binder material of a specified thickness. Based on the thickness, viscosity and other physical properties of the binder material, the coating can be applied to inclined surfaces with the glass beads partially embedded and immobilized in the binder material, and with a portion of each bead projecting from the surface of the binder layer to reflect light.

Figure 1:
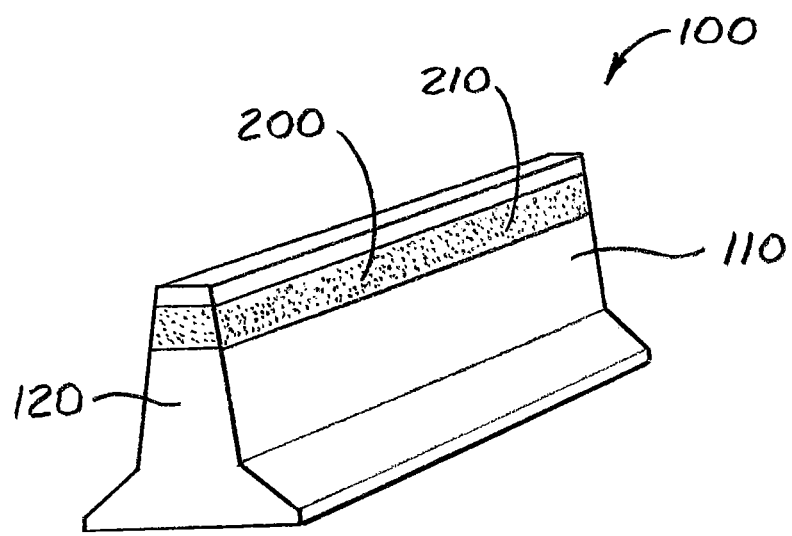
FIG. 1 is a perspective view of a structure having a retroreflective surface in accordance with one exemplary embodiment of the invention.

Referring now to the drawing figures generally, and FIG. 1 in particular, a structure is shown with a retroreflective coating applied in accordance with one exemplary embodiment of the invention. The structure is a concrete Jersey wall or Jersey barrier 100 with an inclined surface 110. Jersey wall 100 is generally designed to be placed alongside a lane of traffic, and may be used to guide traffic or separate the traffic lane from other traffic lanes. A retroreflective stripe or line 200 is applied near the top of inclined surface 110 and extends lengthwise along the inclined surface 110. In this arrangement, retroreflective stripe 200 receives light from passing vehicles and reflects the light back to the motorists, alerting the motorists of the location of Jersey wall 100.

The retroreflective materials of the present invention can be applied to one or more sides of a roadside structure to enhance the structure's visibility in dark conditions. For example, stripe 200 extends along the inclined face 110 and an end wall 120 of Jersey wall 100. This stripe configuration may be desirable on a Jersey wall section positioned at the end of a row, where end wall 120 faces oncoming traffic. Various stripes or patterns may be used in accordance with the invention, and need not be limited to the configurations illustrated in the drawing figures.

Retroreflective stripe 200 is formed by a coating 210 applied to inclined surface 110. Coating 210 includes a quantity of retroreflective granules held together in a layer of binder material. Retroreflective granules in accordance with the invention may include a variety of different retroreflective materials or combinations of materials. For example, the retroreflective granules may all having the same size, geometry and refractive index. Alternatively, the retroreflective granules may be a mixture of different retroreflective elements having differing sizes, geometries and refractive indexes.

Figure 2:
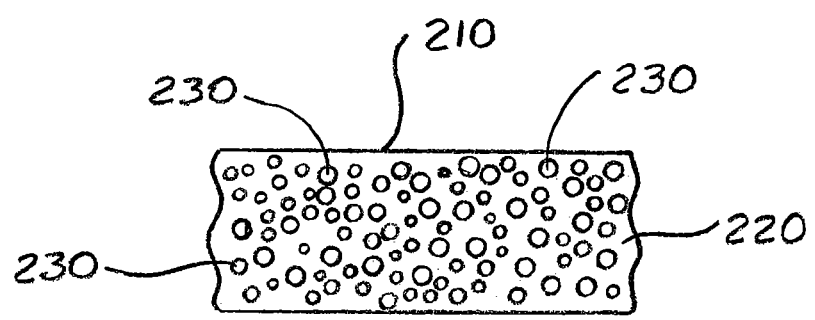
FIG. 2 is an enlarged view of the retroreflective surface of FIG. 1.

FIG. 2 provides a magnified view of retroreflective coating 210, showing an assortment of retroreflective granules held together in a binder layer 220. A variety of retroreflective granules may be used in accordance with the invention. Retroreflective coating 210 contains a quantity of glass beads 230 dispersed throughout binder layer 230. Each glass bead 230 is spherical with a refractive index of at least about 1.5, preferably at least about 1.7, and even more preferably at least about 1.9. In a preferred embodiment, coating 210 contains Ultra 1.9® brand retroreflective glass beads sold by Potters Industries Inc. of Malvern, Pa., U.S.A. or equivalent glass beads. Coating 210 may contain VISIBEAD® brand or VISIBEAD® PLUS II brand glass spheres, also sold by Potters Industries Inc. of Malvern, Pa. U.S.A. Alternatively, or in addition to the foregoing, coating 210 may contain agglomerated glass beads such as those shown and described in U.S. Publication No. 2008/0253833.

Beads 230 are partially but not completely embedded in binder layer 220, so that an exposed portion of each bead projects outwardly from the surface of the binder layer. The exposed portion of each bead focuses incoming light onto the inner surface of the bead, where it illuminates the color of the binder layer, which may be a bright yellow or white road paint. The bead reflects this light back toward the source. In preferred embodiments, beads 230 are coated with a hydrophobic coating or other surface treatment that prevents the binder material from adhering to or otherwise covering the exposed portion of the beads. Binder material that accumulates on the exposed portion of a bead can decrease the retroreflectivity of the bead.

The retroreflective coatings of the present invention can be applied to horizontal or inclined surfaces on various structures or improvements in the vicinity of vehicular traffic, including but not limited to Jersey walls, traffic dividers, barriers, bridge abutments, speed bumps, toll booths, utility poles, sign posts, bollards, fire hydrants, pavements, curbs, medians, sidewalks and cross walks. Coatings in accordance with the invention may be applied to existing structures in situ. Alternatively, roadside structures in accordance with the invention may be manufactured or prefabricated with retroreflective surfaces before they are installed in the vicinity of vehicular traffic.

Figure 3:
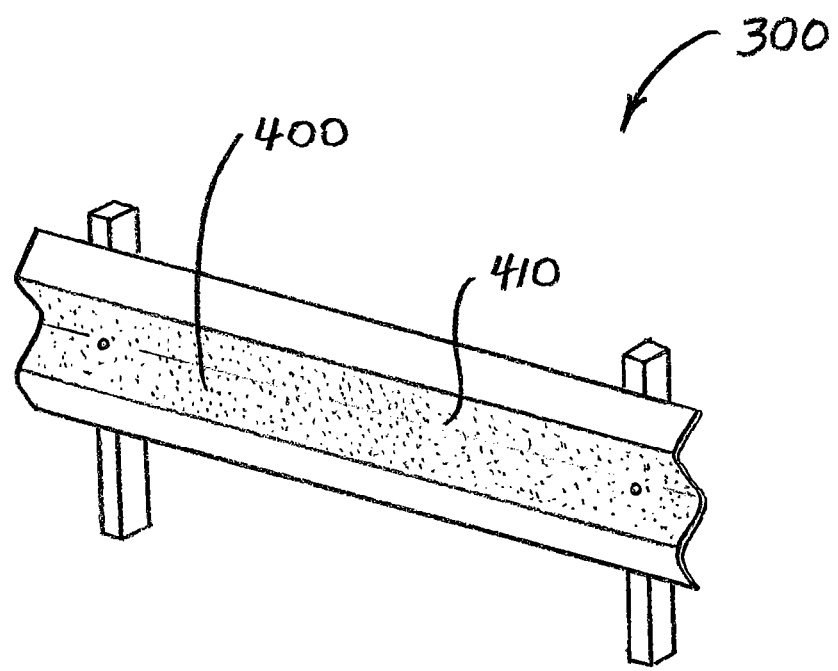
FIG. 3 is a perspective view of a structure having a retroreflective surface in accordance with another exemplary embodiment of the invention.

Referring now to FIG. 3, a steel guard rail 300 is shown in accordance with another exemplary embodiment of the invention. Guard rail 300 has a retroreflective stripe 400 applied along a midportion of the guard rail. Stripe 400 is formed from a retroreflective coating 410 that adheres to the irregularly shaped contour of the guard rail. As noted above, retroreflective stripe 400 may be applied to guard rail 300 when the guard rail is fabricated, or after the guard rail is installed and in use.

The diameters of beads used in accordance with the invention can vary, and need not be of one size. Different size gradations of glass beads may be used, with varying results. The following table summarizes a preferred range of size gradations of glass beads.

| SIZE DISTRIBUTION OF GLASS BEADS | |
|---|---|
| US Sieve No. | Wt. % Retained |
| 18 | 0-2 |
| 20 | 3-15 |
| 30 | 5-25 |
| 50 | 40-65 |
| 100 | 15-35 |
| Pan | 0-5 |

The size distributions summarized in the above table may be determined based on sieve analysis. The left column of the table lists the U.S. sieve sizes, and the right column summarizes the approximate percentage by weight of glass beads that are retained by the corresponding sieve listed in the left column (or for the last row, the pan). Approximately half of the beads are retained by US Sieve No. 50, and thus are larger than 0.0117 in. Approximately 0-5% of glass beads pass through US Sieve No. 100 into the pan, and thus are smaller than 0.0059 in.

A variety of binder materials may be used for binder layer 220, including but not limited to water-borne paint, epoxy, polyester, thermoplastic, PMMA, polyurethane, polyurea and VOC-compliant paints. Beads 230 may be applied at a any coverage rate or density suitable to create a retroreflective surface. Satisfactory results have been observed when beads 230 are applied at a density of about 0.15 pounds/square foot of binder layer. Beads applied at densities that are lower or higher than 0.15 pounds/square foot of binder layer can also achieve satisfactory results. Beads 230 can be applied to a relatively thin layer of binder material. Preferably, binder layer 220 has a thickness of between about 10 mils (0.010 in.) to about 12 mils (0.012 in.).

The combination of bead size, refractive index and binder layer thickness collectively contribute to a retroreflective surface with a surprisingly high durability and brightness under wet, dry, clear or foggy conditions. Although the beads are relatively large compared to other retroreflective materials, they are not so heavy that they settle or slide down inclined surfaces under gravity. The relatively thin binder layer is thick enough to hold the beads in a partially embedded condition.

The coating is preferably applied in a continuous process. The binder layer is applied over the inclined surface, followed by retroreflective materials, such as glass beads. Glass beads may be applied over the binder layer using an apparatus and process as shown and described in U.S. Pat. No. 7,429,146, the contents of which are incorporated by reference herein in their entirety and for all purposes.

Figure 4:
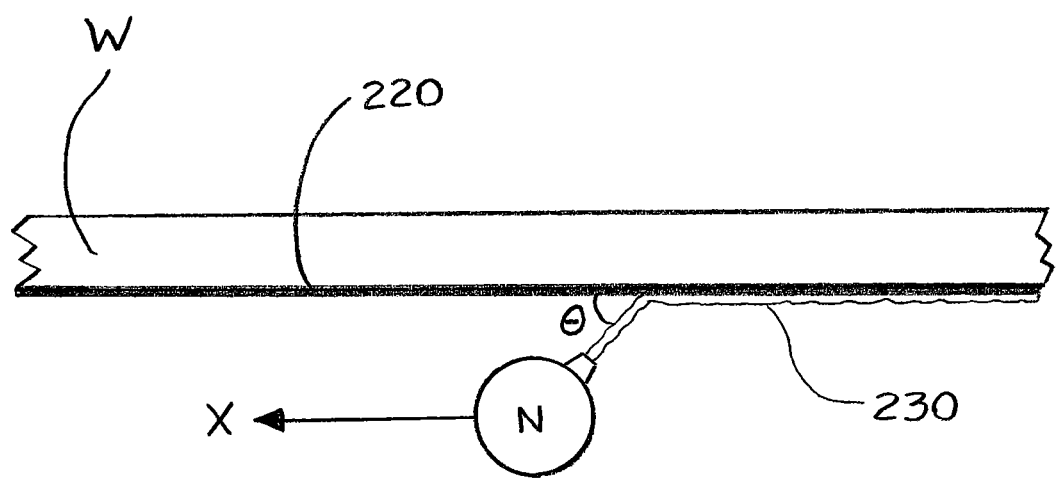
FIG. 4 is top schematic view of a process for applying a retroreflective material onto an inclined surface in accordance with another exemplary embodiment of the invention.

Referring now to FIG. 4, a preferred method for applying a retroreflective coating to an inclined surface will be described in accordance with the invention. FIG. 4 shows a schematic overhead view of the process of applying glass beads 230 to a binder layer 220 that has been applied to an inclined wall surface W. As noted above, binder layer 220 is preferably applied at a thickness of between about 10 mils (0.010 in.) to about 12 mils (0.012 in.). Thicknesses within this range have been found to be thick enough to embed glass beads of a desired size range, while not so thick as to cause the layer to run off of the inclined surface under gravity.

Glass beads 230 are applied with a nozzle N which is moved along a path parallel to the length of wall surface W. The direction of motion of nozzle N is shown by arrow X. The orientation of nozzle N is fixed as it moves along wall surface W. The fixed orientation of nozzle N discharges glass beads at an acute angle $\Theta$ with respect to the longitudinal axis of wall surface W.

It has been found that glass beads of a preferred size gradation can consistently embed in the binder layer at desired depths when angle $\Theta$ is controlled within a preferred range. When nozzle angle $\Theta$ is less than the preferred range, the beads do not contact the binder layer with sufficient force to embed in the binder layer to the desired depth. When nozzle angle $\Theta$ exceeds the preferred range, the beads are more likely to deflect or ricochet from the wall surface. Preferably, nozzle angle $\Theta$ is between about 30 degrees and about 50 degrees. More preferably, nozzle angle $\Theta$ is between about 40 degrees and about 50 degrees. Even more preferably, nozzle angle $\Theta$ is between about 40 degrees and about 45 degrees.

It has also been found that glass beads embed with less splattering of the binder layer when the beads are discharged in a direction away from the direction of movement of the nozzle. FIG. 4 shows an example of this, where beads 230 are propelled in a direction away from the direction of motion X of nozzle N. That is, if direction X is considered a forward direction of nozzle N, the beads are ejected from nozzle N in a rearward direction. This reduces the net velocity of the beads and reduces or eliminates splattering than can occur when beads contact the binder with too much velocity.

Thus far, the retroreflective coating and process for applying it have been described in the context of applying the coating to inclined walls. This is not intended to mean that the same coating and process cannot be used on horizontal surfaces. In addition, it is not intended to limit the coating and process only to surfaces with large angles of inclination. Moreover, it is not intended to limit the coating and process only to structures, improvements, or other stationary objects. Accordingly, the coating and process may be applied on perfectly horizontal surfaces, such as floors, pavements and medians, as well as mildly graded surfaces, such as ramps. Retroreflective coatings and application processes in accordance with the invention may be used to enhance visibility of any structure, improvement or object that presents a horizontal or inclined surface. The coatings and application processes may be used on flat surfaces, curved surfaces or irregular surfaces.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method of applying a retroreflective surface to an inclined surface on a structure, said method comprising the steps of:
    applying a binder material to at least a portion of the inclined surface, wherein a thickness dimension of the applied binder material is at least 10 mil; and
    embedding a plurality of retroreflective granules at least partially within the thickness dimension of the binder material, the plurality of retroreflective granules being coated with a hydrophobic coating and having a density of at least 0.06 pounds/square foot as embedded in said binder material, each retroreflective granule comprising a glass member having a refractive index of at least 1.5 and a diameter greater than about 0.012 in., wherein said retroreflective granules are discharged from a nozzle onto the inclined surface, the nozzle moving in a forward direction with respect to the structure, and the direction of discharge being in a backward direction relative to the movement of the nozzle with respect to the structure.

2. The method of claim 1, wherein the step of applying a binder material comprises applying a binder material having a thickness dimension of between about 10 mil and about 12 mil.

3. The method of claim 1 wherein the step of applying a binder material comprises applying a binder material in a generally horizontal direction along a length of the structure.

4. The method of claim 1 wherein said binder material is applied to said at least a portion of said inclined surface prior to assembly of said structure.

5. The method of claim 4 wherein said plurality of retroreflective granules are embedded in said binder material prior to assembly of said structure.

6. A method of applying a retroreflective surface to an inclined surface on a structure, said structure generally extending along a horizontal dimension, said method comprising the steps of:
    applying a binder material to at least a portion of the inclined surface, wherein a thickness dimension of the applied binder material is at least 10 mil; and
    embedding a plurality of retroreflective granules at least partially within the thickness dimension of the binder material, the plurality of retroreflective granules having a density of at least 0.06 pounds/square foot as embedded in said binder material, each retroreflective granule comprising a glass member having a refractive index of at least 1.5 and a diameter greater than about 0.012 in., wherein the said retroreflective granules are applied from a nozzle onto the inclined surface, the nozzle aimed in a discharge direction that is oriented at an acute angle with respect to the horizontal dimension of the inclined surface.

7. The method of claim 6, wherein the acute angle is between about 30 degrees and about 50 degrees with respect to the inclined surface.

8. The method of claim 6, wherein the acute angle is between about 40 degrees and about 50 degrees with respect to the inclined surface.

9. The method of claim 6, wherein the acute angle is about 45 degrees with respect to the inclined surface.

10. The method of claim 6, wherein the nozzle moves in a first direction relative to the structure during application of the retroreflective granules.

11. The method of claim 10, wherein the nozzle is oriented with a discharge direction that is aimed in a direction away from the direction of movement of the nozzle.

12. The method of claim 6, wherein the step of applying a binder material comprises applying a binder material having a thickness dimension of between about 10 mil and about 12 mil.

13. The method of claim 6 wherein the step of applying a binder material comprises applying a binder material in a generally horizontal direction along a length of the structure.

14. The method of claim 6 wherein said binder material is applied to said at least a portion of said inclined surface prior to assembly of said structure.

15. The method of claim 14 wherein said plurality of retroreflective granules are embedded in said binder material prior to assembly of said structure.

* * * * *